United States Patent
Tani

(10) Patent No.: US 7,333,668 B2
(45) Date of Patent: Feb. 19, 2008

(54) IMAGE DATA COMPRESSING APPARATUS AND IMAGE DATA EXTRACTING APPARATUS

(75) Inventor: Hirofumi Tani, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 693 days.

(21) Appl. No.: 10/943,332

(22) Filed: Sep. 17, 2004

(65) Prior Publication Data

US 2005/0078877 A1 Apr. 14, 2005

(30) Foreign Application Priority Data

Sep. 18, 2003 (JP) ............................ P2003-326268

(51) Int. Cl.
G06K 9/36 (2006.01)
G06K 9/46 (2006.01)
(52) U.S. Cl. ...................................... 382/244; 382/245
(58) Field of Classification Search ................ 382/244, 382/245; 348/569
See application file for complete search history.

(56) References Cited

U.S. PATENT DOCUMENTS 6,011,539 A * 1/2000 Hamilton et al. ........... 345/156
6,175,388 B1 * 1/2001 Knox et al. .................. 348/569
7,202,912 B2 * 4/2007 Aneja et al. ................. 348/569

FOREIGN PATENT DOCUMENTS

JP 2003-87790 3/2003

* cited by examiner

Primary Examiner—Phuoc Tran
(74) Attorney, Agent, or Firm—Osha Liang LLP

(57) ABSTRACT

An image-data compressing apparatus includes: a start-focus-point setting unit that sets a start-focus point; a draw-point presence/absence setting unit that sets a draw-point presence/absence information bit; a draw-start-point information setting unit that sets a draw-start point information bit; a draw-point-number information setting unit that sets a draw-point number information bit; and a start-focus point/draw-point presence/absence setting unit that sets a draw-point presence/absence information bit, wherein, the respective units repeats the process thereof for a plurality of rows corresponding to the dot columns in the binary image data, to thereby obtain a compressed data of the binary image data from a bit string of the bits set by the respective units.

9 Claims, 5 Drawing Sheets

IMAGE DATA COMPRESSING APPARATUS AND IMAGE DATA EXTRACTING APPARATUS

BACKGROUND OF THE INVENTION

1. Field of the Invention

The present invention relates to a method for compressing and extracting image data of an OSD image displayed by an OSD (On Screen Display) function of a display.

2. Description of the Related Art

Conventionally, an image data output device that executes an OSD function has been introduced commercially. The OSD function is a function to improve user operability, and specifically, a function to display images showing the operating state, the operating method, and the like of an apparatus main unit to which this image data output device is applied, on a screen of a display device connected to the apparatus main unit.

The image data output device provided with such an OSD function is applied to various apparatus, such as a receiver apparatus for receiving television broadcasts, which is a so-called set-top box, and a DVD player apparatus for reproducing data recorded in DVDs (Digital Versatile Disks). The image data output device applied to the set-top box, for example, allows a display device to display an OSD image that indicates the channel number of the channel currently received by the main unit. Likewise, the image data output device applied to the DVD apparatus allows a display device to display an OSD images that indicates the state of reproducing operations such as pause, fast forward, and rewind.

The image data output device has an OSD memory that stores OSD image data to be displayed on a screen of a display device using the OSD function, reads out and outputs the OSD image data stored in this OSD memory in response to the operating state at the time.

An image-data compressing method of compressing OSD image data for the purpose of reducing the capacity of the OSD memory that stores OSD image data as small as possible has been conventionally known (for example, see JP-A-2003-087790). In this conventional image-data compressing method, the pixel at the top-left corner in image data is set as a start point pixel. Then, the number of pixels being contiguous from the start point pixel along the scanning direction and having the same image data as that of the start point pixel is obtained. Further, the next pixel to the pixels the number of which was obtained here, that is, the first pixel having a different pixel data from that of the start point pixel among the pixels contiguous along the scanning direction from the start point pixel is set as a new start point pixel, and the number of pixels contiguous along the scanning direction and having the same image data as the start point pixel is obtained. This operation is repeated, and thereby it is possible to obtain compressed data including a plurality of data in which the image data of each start point pixel is paired with the number of the pixels having the same pixel data as that of the start point pixel and being contiguous along the scanning direction.

SUMMARY OF THE INVENTION

However, with the conventional image-data compressing method described above, the following problem arises; an OSD image is compressed into a plurality of sets of data including the image size, the scanning direction, and a plurality of data in which pixel data is paired with the number of contiguous pixels; however, since the number of pixels can become an unexpectedly large value depending the shape and size of the image, it is necessary to ensure an extra capacity of the OSD memory in order cope with this, and the problem arises that reduction in capacity of the OSD memory cannot be sufficiently achieved.

The invention has accomplished in order to solve the foregoing problem, and one of objects of the invention is to provide a method of compressing image data that is capable of compressing an OSD image data efficiently so that the capacity of OSD memory can be further reduced.

According to a first aspect of the invention, there is provided an image-data compressing apparatus for compressing a binary image data, the apparatus including: a start-focus-point setting unit that focuses on one row along a scanning direction of dot columns in the binary image data and sets one end of the one row as a start-focus point; a draw-point presence/absence setting unit that sets a draw-point presence/absence information bit indicating whether or not a draw point exists ahead of the start-focus point; a draw-start-point information setting unit that sets a draw-start point information bit indicating how many dots away from the start-focus point a draw-start point is if the draw point is present; a draw-point-number information setting unit that sets a draw-point number information bit that indicates how many draw point continues from the draw start point; and a start-focus point/draw-point presence/absence setting unit that sets a next dot to the draw point that is a subject to the set draw-point number information bit as a next start-focus point, and sets a draw-point presence/absence information bit that indicates whether or not a draw point exists ahead of the next start-focus point, wherein, after the start-focus point being set by the start-focus-point setting unit, the draw-point presence/absence setting unit, the draw-start-point information setting unit, the draw-point-number information setting unit, and the start-focus point/draw-point presence/absence setting unit repeats the process thereof for a plurality of rows corresponding to the dot columns in the binary image data, to thereby obtain a compressed data of the binary image data from a bit string of the bits set by the respective units.

According to a second aspect of the invention, there is provided an image-data compressing method for compressing a binary image data, the method including: focusing on one row along a scanning direction of dot columns in the binary image data and setting one end of the one row as a start-focus point; setting a draw-point presence/absence information bit indicating whether or not a draw point exists ahead of the start-focus point; setting a draw-start point information bit indicating how many dots away from the start-focus point a draw-start point is if the draw point is present; setting a draw-point number information bit that indicates how many draw point continues from the draw start point; and setting a next dot to the draw point that is a subject to the set draw-point number information bit as a next start-focus point, and setting a draw-point presence/absence information bit that indicates whether or not a draw point exists ahead of the next start-focus point, wherein, after the start-focus point being set, the processes for setting the draw-point presence/absence information bit, the draw-start-point information bit, the draw-point-number information bit, and the draw-point presence/absence information bit are repeated for a plurality of rows corresponding to the dot columns in the binary image data, to thereby obtain a compressed data of the binary image data.

According to a third aspect of the invention, there is provided an image-data extracting apparatus for extracting binary image data from compressed data, the apparatus including: a focus bit setting-unit that focuses on a first bit in the compressed data and sets the first bit as a fist focused bit; a draw-point presence/absence determining unit that determines whether or not a draw point exists ahead of a focused dot corresponding to the focused bit based on the present focused bit; a non-draw-point setting unit that, in a case where determined that no draw point exists by the draw-point presence/absence determining unit, sets a bit next to the present focused bit as a present focused bit, and sets non-draw point to the focused dot and the subsequent dots for one row along a scanning direction of dot columns in the binary image data; and a draw-point setting unit that, in a case where determined that draw point exists by the draw-point presence/absence determining unit, sets a bit next to the present focused bit as a present focused bit, sets non-draw point to the dots from the focused dot to the dot just before the draw point, sets a bit next to the present focused bit as a present focused bit, and sets draw point to the present focused dot and the subsequent dots based on the focused bit, wherein after the first focused bit being set by the focus bit setting unit, the draw-point presence/absence determining unit, the non-draw-point setting unit, and the draw-point setting unit repeats the process thereof, to thereby extracting the binary image data from the compressed data.

According to a fourth aspect of the invention, there is provided an image-data extracting method for extracting binary image data from compressed data, the method including: focusing on a first bit in the compressed data and setting the first bit as a fist focused bit; determining whether or not a draw point exists ahead of a focused dot corresponding to the focused bit based on the present focused bit; performing, in a case where determined that no draw point exists by the draw-point presence/absence determining unit, the process of setting a bit next to the present focused bit as a present focused bit, and setting non-draw point to the focused dot and the subsequent dots for one row along a scanning direction of dot columns in the binary image data; and performing, in a case where determined that draw point exists by the draw-point presence/absence determining unit, the process of setting a bit next to the present focused bit as a present focused bit, setting non-draw point to the dots from the focused dot to the dot just before the draw point, setting a bit next to the present focused bit as a present focused bit, and setting draw point to the present focused dot and the subsequent dots based on the focused bit, wherein after the first focused bit being set, the determining process, the non-draw point setting process, and the draw point setting process are repeated, to thereby extracting the binary image data from the compressed data.

BRIEF DESCRIPTION OF THE DRAWINGS

The above objects and advantages of the present invention will become more apparent by describing a preferred exemplary embodiment thereof in detail with reference to the accompanying drawings, wherein.

DETAILED DESCRIPTION OF THE PREFERRED EMBODIMENTS

Referring now to the accompanying drawings, a description will be given in detail of preferred embodiments of the invention.

Figure 1:
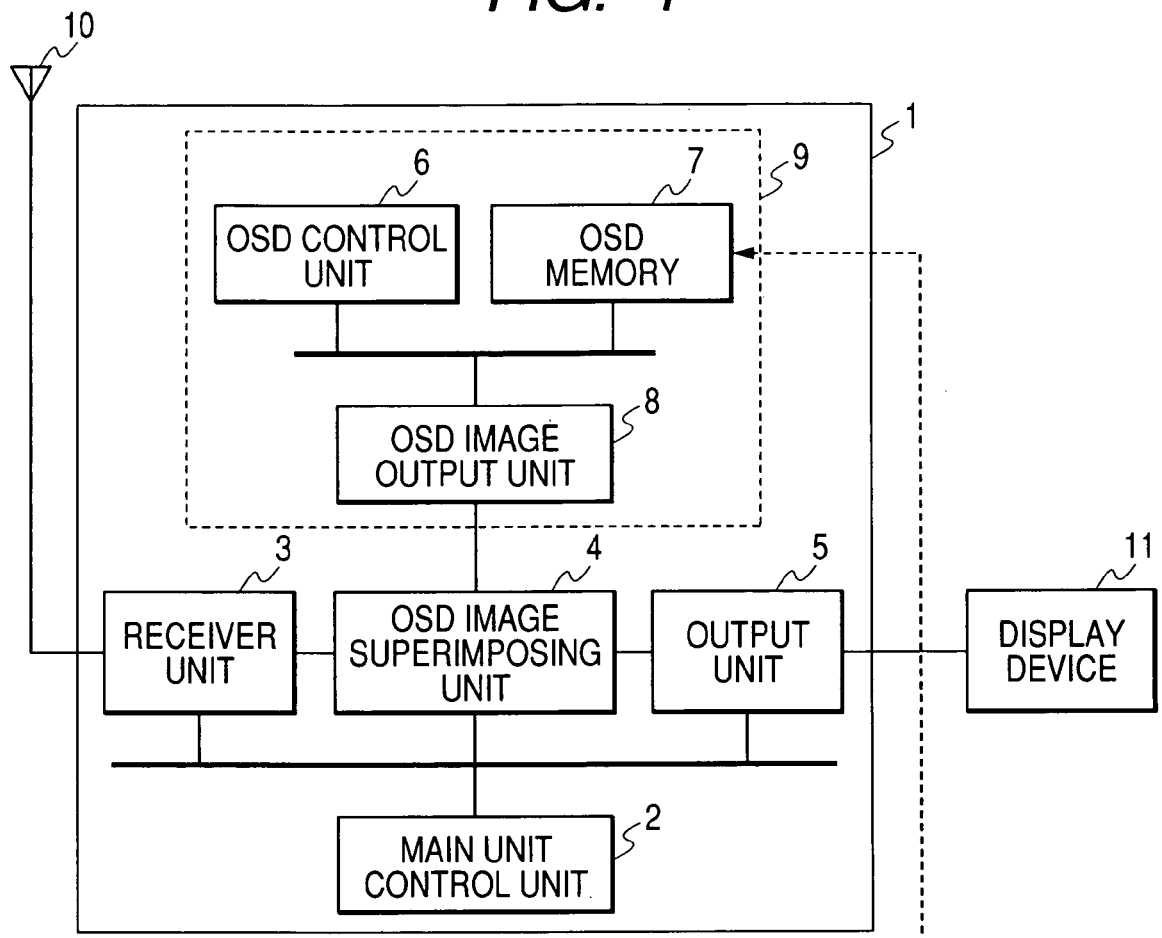
FIG. 1 is a block diagram illustrating a configuration of a set-top box including an image data output device that adopts a method of compressing image data according to one embodiment the invention, and a characteristic configuration of a data processing apparatus that generates compressed data to be written into an OSD memory.
Figure 1:
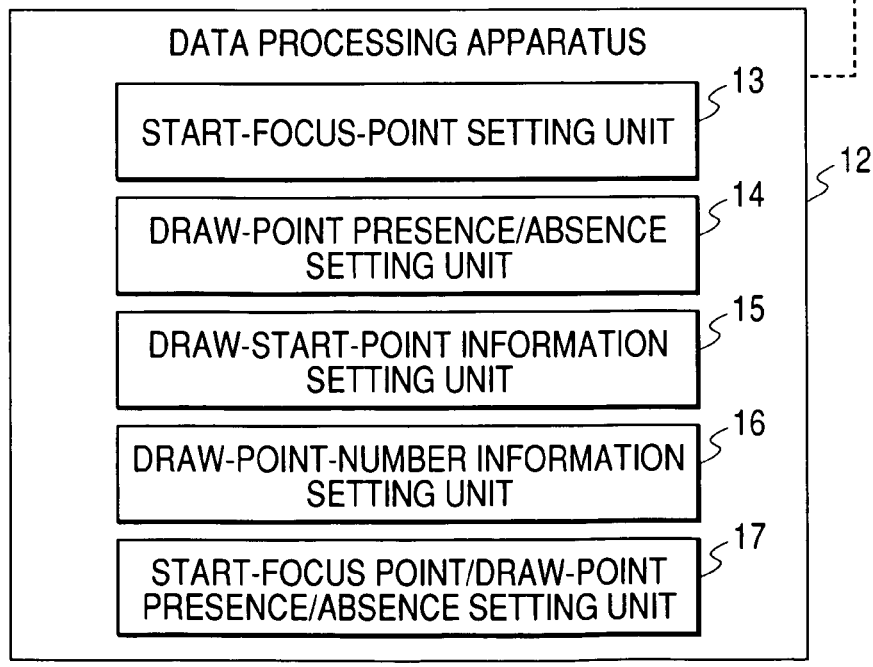

FIG. 1 is a block diagram illustrating a configuration of a set-top box equipped with an image data output device that adopts an image-data compressing method according to one embodiment of the invention, and a characteristic configuration of a data processing apparatus that generates compressed data to be written into an OSD memory.

In FIG. 1, a receiver apparatus 1 includes a main unit control unit 2 for controlling operations of an apparatus main unit, a receiver unit 3 for taking out a broadcast signal of a selected channel from television broadcast signal received by an antenna 10, an OSD image superimposing unit 4 for combining an OSD image data that is output from a later-described image data output device 9 and a received image data that results from the broadcast signal taken out by the receiver unit 3, and an output unit 5 for outputting an image signal that is input from this OSD image superimposing unit 4.

The OSD image superimposing unit 4 outputs the received image data taken out by the receiver unit 3 as it is when no OSD image is input from the image data output device 9. A display device 11 displays images resulting from an image signal that is input from the output unit 5.

The image data output device 9 includes an OSD control unit 6, an OSD memory 7 that stores OSD image data, and an OSD image output unit 8 that outputs OSD image data. The OSD memory 7 stores OSD image data that are compressed (hereinafter referred to as "compressed data"). The OSD control unit 6 reads out compressed data stored in the OSD memory 7 as necessary, and inputs decompressed OSD image data from the OSD image output unit 8 to the OSD image superimposing unit 4.

OSD images include such an image that indicate a channel number of broadcast signal taken out by the receiver unit 3. In many of the OSD images, the image size (width× height) is small, the colors are a few (for example, about two to three colors), pixels with the same color are grouped together, and surrounding pixels have the same color.

The data processing apparatus 12 includes: a start-focus-point setting unit 13 for focusing only one row along the scanning direction of dot columns in an image and setting one end of the one row along the scanning direction of the image as a start-focus point; a draw-point presence/absence setting unit 14 for setting a draw-point presence/absence information bit indicating, respectively, a logical "1" if a draw point exists ahead of the start-focus point and a logical "0" if no draw point exists ahead of the start-focus point; a draw-start-point information setting unit 15 for setting a draw start point information bit indicating how many dots away the draw start point is with respect to the start-focus point if the draw point is present; a draw-point-number information setting unit 16 for setting, as a draw-point number information bit, a value obtained by subtracting a numerical value 1 from the total number of the draw point of the draw start point and the draw points that follow the foregoing draw point; and a start-focus point/draw-point presence/absence setting unit 17 for setting, as the next start-focus point, the next dot to the draw points that are subject of the set draw-point number information bit, and setting a draw-point presence/absence information bit indicating, respectively, a logical "1" if a draw point exists ahead of the just-noted start-focus point and a logical "0" if no draw point exists. By this data processing apparatus 12, OSD image data are compressed, and the compressed data are written into the OSD memory 7.

In compressing OSD image data, after setting the start-focus point by the start-focus-point setting unit 13, the processes of the draw-point presence/absence setting unit 14, the draw-start-point information setting unit 15, the draw-point-number information setting unit 16, and the start-focus point/draw-point presence/absence setting unit 17 are repeated for a plurality of rows of dot columns in an image; a bit string of the respective bits obtained by the above-noted respective units are used as a compressed data of the OSD image data; and this compressed data is written into the OSD memory 7.

Figure 2:
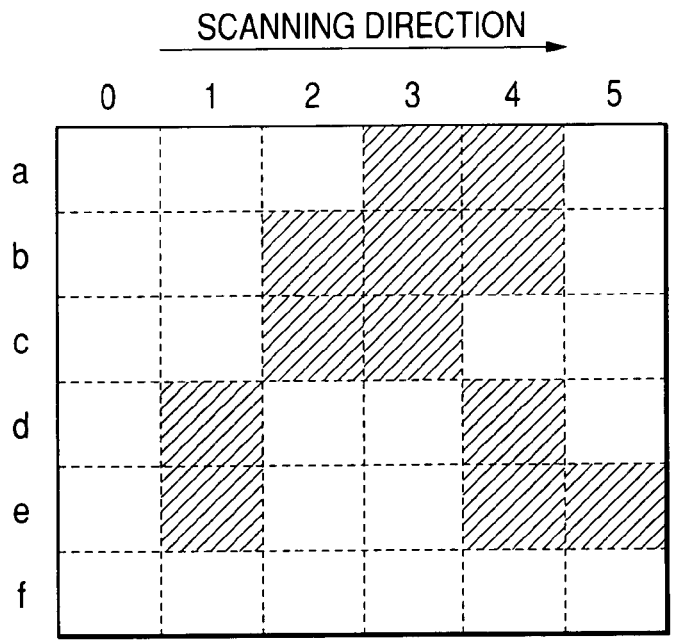
FIG. 2 illustrates one example of an OSD image in the embodiment.

FIG. 2 is a view illustrating one example of an OSD image in the embodiment. In FIG. 2, the color of the dots (pixels) indicated by hatching is black, and the color of the rest of the dots is white. Also, symbols "a" to "f" indicate rows, and 0 to 5 are the numbers that indicates what number a dot in rows "a" to "f" is. In the case of the OSD image shown in FIG. 2, in the row "a" the zeroth to second dots are white dots, the third and fourth dots are black dots, and fifth dot is a white dots. In the row "b", the zeroth and first dots are white dots, the second to fourth dots are black dots, and the fifth dot is a white dot. In the row "c", the zeroth and first dots are white dots, the second and third dots are black dots, and the fourth and fifth dots are white dots. In the row "d", the zeroth dot is a white dot, the first dot is a black dot, the second and the third dots are white dots, the fourth dot is a black dot, and the fifth dot is a white dot. In the row "e", the zeroth dot is a white dot, the first dot is a black dot, the second and third dots are white dots, and the fourth and fifth dots are black dots. In the row "f", the zeroth through fifth dots are white dots.

Figure 3:
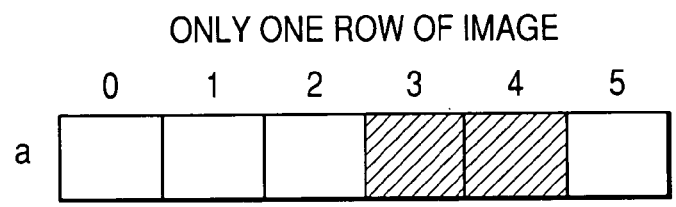
FIG. 3 illustrates an image that represents only a row "a" shown in FIG. 2.

FIG. 3 illustrates an image that represents only the row "a" in FIG. 2. in this row "a", the zeroth through second dots show white dots, the third and fourth dots show black dots, and the fifth dot shows a white dot.

Figure 4:
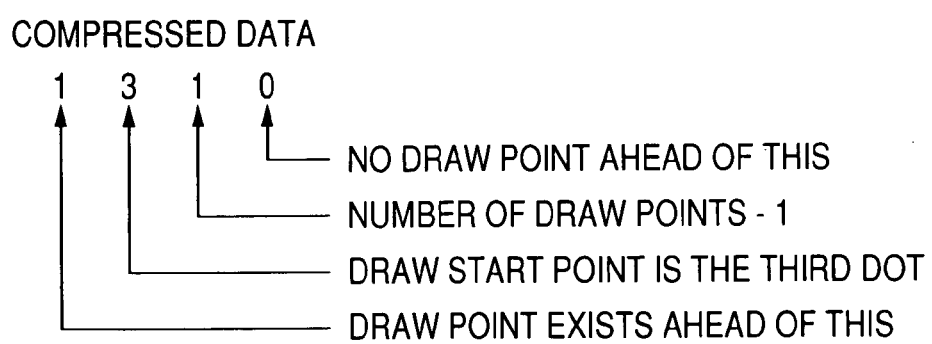
FIG. 4 illustrates the image shown in FIG. 3, represented by compressed data.

FIG. 4 is a view illustrating the OSD image shown in FIG. 2, represented by compressed data. In this compressed data, the numeral 1 on the left end is a numerical value that indicates the presence of draw point (black dot) ahead of the zeroth dot (start-focus point) of the row "a", and the next numeral 3 is a numerical value that indicates the draw start point (black dot) is at the third dot with respect to the start-focus point. The further next numeral 1 is a numerical value obtained by subtracting a numerical value 1 from the number of draw points (in this case, the total of 2, the third black dot and the fourth black dot). The numeral 0 on the right end is a numerical value that indicates the absence of draw point (black dot) ahead of this in this row "a".

Figure 5:
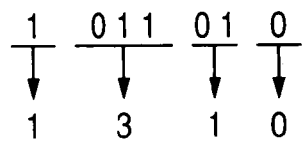
FIG. 5 illustrates compressed data in which the compressed data shown in FIG. 4 are binarized.

FIG. 5 illustrates compressed data in which the compressed data shown in FIG. 4 are binarized. In FIG. 5, of the bits "1 0 1 1 0 1 0", the first bit "1" from the left indicates a numerical value 1, the second, third, and fourth bits "0 1 1" indicate a numerical value 3. Likewise, the fifth and sixth bits "0 1" indicate a numerical value 1, the seventh bit "0" indicates a numerical value 0. In the case of this example, the image of one row comprises 6 dots. Therefore, the first bit can be expressed by 1 bit corresponding to two numerical values 0 and 1; the second, third, and fourth bits can be expressed by 3 bits corresponding to 6 numerical values 0 through 5; the fifth and sixth bits can be expressed by 2 bits corresponding to 3 numerical values 0 to 2; and the seventh bit can be expressed by 1 bit corresponding to two numerical values 0 and 1.

Figure 6:
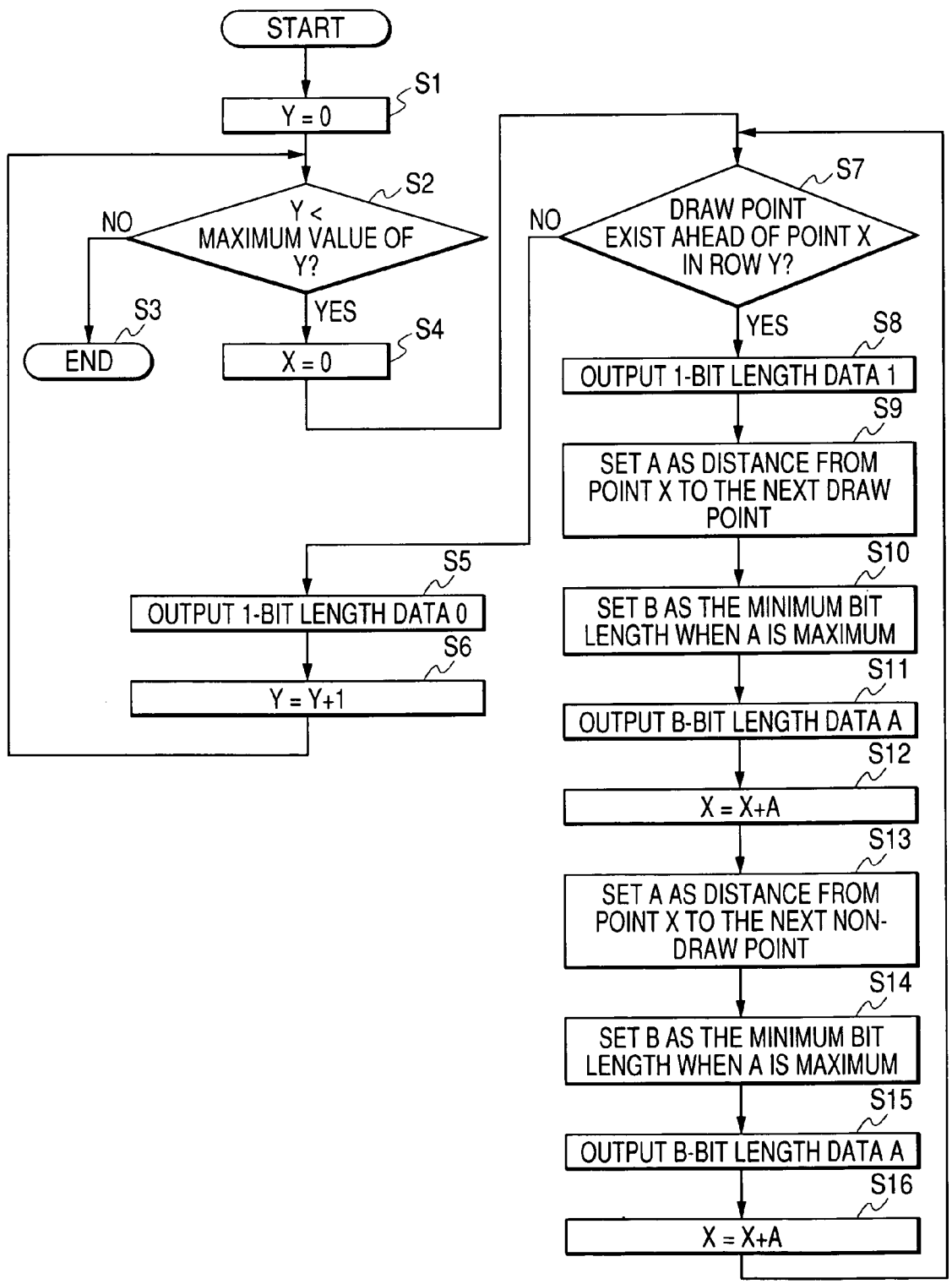
FIG. 6 is a flowchart for illustrating the image data compression process in the embodiment.

FIG. 6 is a flowchart for illustrating an image data compression process in the embodiment. Referring to this flowchart, the image data compression process is described. First, in step Si, Y is assigned to be a row number of an OSD image, and it is assumed Y=0. That is, the first row of the OSD image (for example, the row "a" in FIG. 2) is set to have a row number Y=0. Here, when the size of the OSD image along the horizontal direction (scanning direction) is assigned to be XMAX and the logical maximum number of the length of bit string is LMAX, LMAX=XMAX.

In step S2, it is determined whether or not Y is smaller than the maximum value of Y. If Y is smaller than the maximum value of Y, the process proceeds to step S4, in which rows of the OSD image are processed one by one, and when Y becomes greater than the maximum value of Y, this process is terminated (step S3).

If Y is less than the maximum value of Y, the process sets X=0 in step S4. X is a point at which it is determined whether or not a draw point exists ahead of the start-focus point in one row of the image, that is, the start-focus point. That X=0 means that a point X is at the zeroth location in a column of the image.

In step S7, it is determined whether or not a draw point exists ahead of the point X (start-focus point) in the row Y. If a draw point exists ahead of the point X, the process proceeds to step S8, where a 1-bit length data 1 is output. Here, for example, the numerical value 1 of the compressed data shown in FIG. 4 is output. In step S9, the process sets A as the distance from the point X to the next draw point, and sets LMAX=LMAX−A.

In step S10, the process sets B as the minimum bit length when A is the greatest, and in step S11, a B-bit length data A is output. Here, for example, the numerical value 3 of the compressed data shown in FIG. 4 is output. It should be noted that A=3 and B=3 in the compressed data of this example. That is, this compressed data includes the bits "0 1 1", which have a 3-bit length.

In step S12, the process sets X=X+A. In other words, A is added to X. Thereby, the start-focus point is shifted, and therefore, in step S13, the process sets A as the distance from a point X that is a new start-focus point to the next non-draw point. In other words, the process sets LMAX=LMAX−A. This A is a distance from the point that is currently being drawn to a point that is not being drawn, and indicates the number of draw points. It should be noted that the number of draw points is represented by, as compressed data, a numerical value obtained by subtracting 1 therefrom, as has been explained with FIG. 4.

In step S14, the process sets B as the minimum bit length when A is the greatest, and in step S15, a B-bit length data A is output. Next, in step S16, the process sets X=X+A, and thereafter returns to step S7, followed by similar processing. If no more draw point exists ahead of the point X in row Y, the process proceeds to step S5, wherein a 1-bit length data 0 is output. That is, the last bit of numerical value 0 in the compressed data shown in FIG. 4 is output.

Then, in step S6, the process sets Y=Y+1, and proceeds to the process for the next row in the OSD image, in which the process subsequent to step S2 is carried out in a similar manner.

Thus, according to the embodiment, the following are performed. Focusing on only one row along the scanning direction of dot columns in an image, one end of the one row along the scanning direction in the image is set as a start-focus point. A draw-point presence/absence information bit, a draw start point information bit, and a draw-point number information bit are generated. The next dot to a draw point that is the subject of the draw-point number information bit is set as a next start-focus point. A draw-point presence/absence information bit is generated. Further, bit strings of these bits are generated for a plurality of rows, and the bit strings of these bits form compressed data of the image data. Therefore, OSD image data can be compressed efficiently, and the capacity of OSD memory can be further reduced. Thereby, cost can be reduced for apparatus main units such as DVD players, VHS player, and televisions, which have an OSD function.

According to the embodiment, OSD image data can be compressed efficiently and the capacity of OSD memory can be further reduced. This makes it possible to reduce cost of apparatus main units, such as DVD players, VHS players, televisions, which have an OSD function.

According to the embodiment, the draw-point number information bit indicates a value obtained by subtracting a numerical value 1 from the total number of a draw point of the draw start point and subsequent draw points that follow the draw point of the draw start point. Therefore, if there is no subsequent draw point that follows the draw start point, the total number results in a numerical value 1. Subtracting a numerical value 1 from the numerical value 1 yields a numerical value 0, which is expressed as a logical "0" by the draw-point number information bit. Correspondingly, the number of bits representing the number of draw points can be made less, which serves to improve the efficiency in data compression.

Hereinafter, the process of extracting the compressed data stored in the OSD memory 7 will be described in detail.

Figure 7:
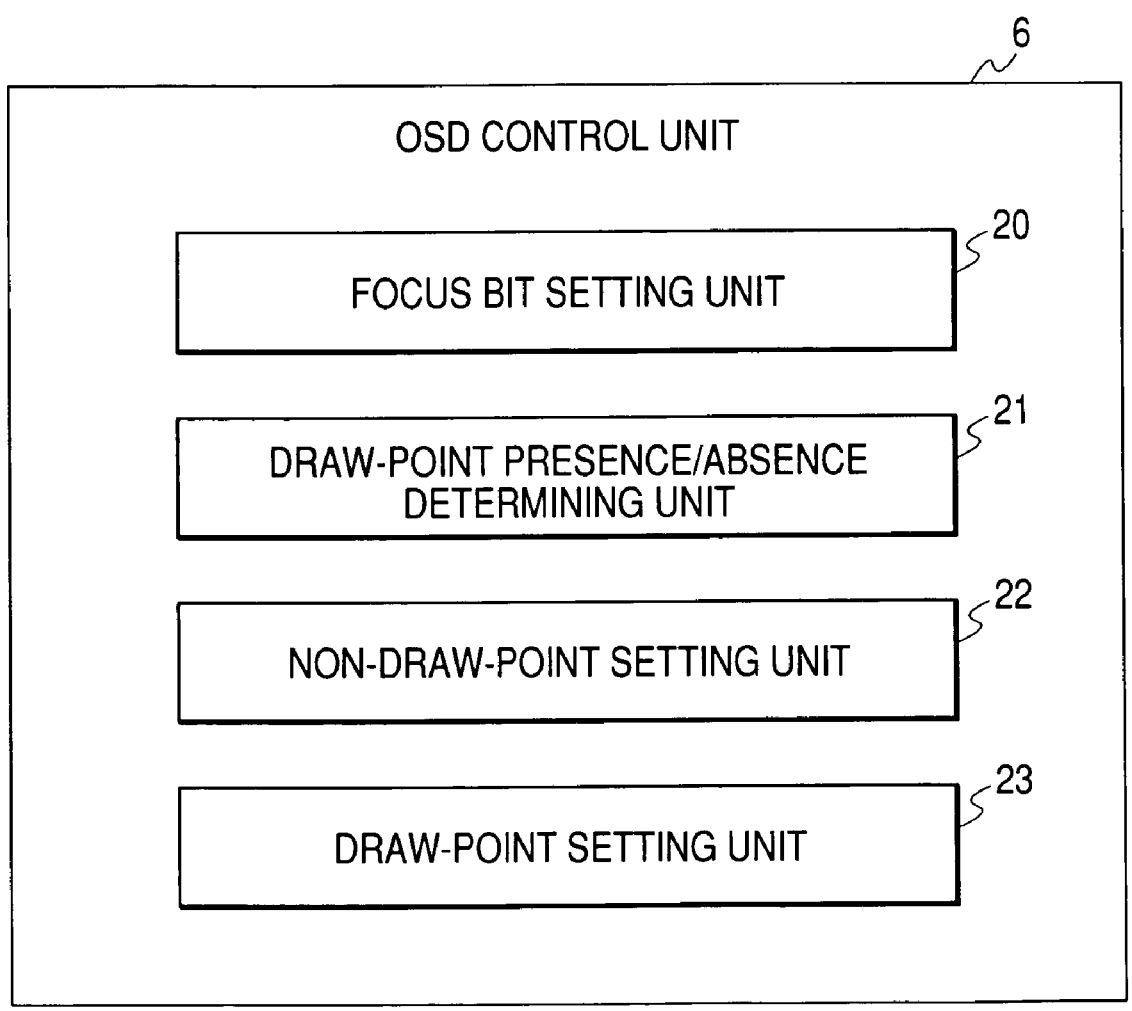
FIG. 7 is a block diagram illustrating a configuration of an OSD control unit.

As shown in FIG. 7, the OSD control unit 6 includes: a focus bit setting unit 20, a draw-point presence/absence determining unit 21, a non-draw-point setting unit 22, and a draw-point setting unit 23.

The focus bit setting unit 20 focuses on a first bit in the compressed data and sets the first bit as a fist focused bit. The draw-point presence/absence determining unit 21 determines whether or not a draw point exists ahead of a focused dot corresponding to the focused bit based on the present focused bit. The non-draw-point setting unit 22, in a case where determined that no draw point exists by the draw-point presence/absence determining unit, sets a bit next to the present focused bit as a present focused bit, and sets non-draw point to the focused dot and the subsequent dots for one row along a scanning direction of dot columns in the OSD image data (binary image data). The draw-point setting unit 23, in a case where determined that draw point exists by the draw-point presence/absence determining unit, sets a bit next to the present focused bit as a present focused bit, sets non-draw point to the dots from the focused dot to the dot just before the draw point, sets a bit next to the present focused bit as a present focused bit, and sets draw point to the present focused dot and the subsequent dots based on the focused bit.

In extracting the compressed data, the focus bit setting unit 20 sets the first focused bit. After then, the draw-point presence/absence determining unit 21, the non-draw-point setting unit 22, and the draw-point setting unit 23 repeats the process thereof, to thereby extracting the OSD image data from the compressed data.

Figure 8:
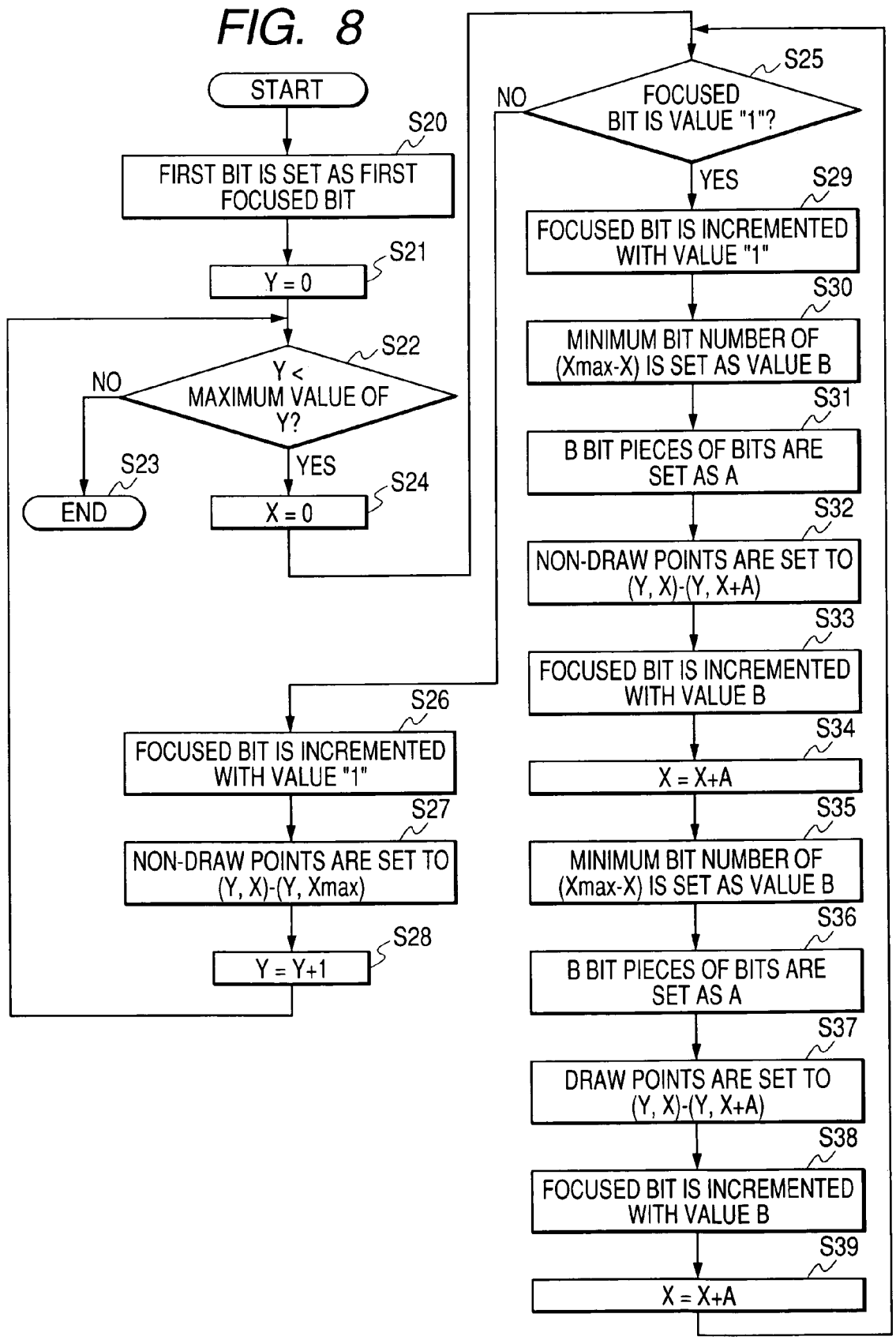
FIG. 8 is a flowchart for illustrating an OSD image data extracting process.

Hereinafter, the process of extracting the compressed data by the OSD control unit 6 will be described in more detail with reference to FIG. 8. FIG. 8 is a flowchart for illustrating a compressed data extracting process in the embodiment.

First, in step S20, a first bit in the compressed data is focused and the first bit is set as a fist focused bit. Next, Y is assigned to be a row number of an OSD image, and it is assumed Y=0. That is, the first row of the OSD image (for example, the row "a" in FIG. 2) is set to have a row number Y=0 (step S21). Here, when the size of the OSD image along the horizontal direction (scanning direction) is assigned to be XMAX and the logical maximum number of the length of bit string is LMAX, LMAX=XMAX.

In step S22, it is determined whether or not Y is smaller than the maximum value of Y. If Y is smaller than the maximum value of Y, the process proceeds to step SS24, and when Y becomes greater than the maximum value of Y, this process is terminated (step S23).

If Y is less than the maximum value of Y, the process sets X=0 in step S24. X is a value corresponds to a coordinate of the OSD image in the horizontal direction.

In step S25, it is determined whether or not the focused bit is value "1". If the focused bit is not value "1" (i.e. value "0"), the process proceeds to step S26. If the focused bit is value "1", the process proceeds to step S29.

In step S26, the focused bit is incremented with value "1". Which means that a bit next to the present focused bit is set as a new focused bit. Next, non-draw points are set to the OSD image for the pixels from (Y, X) to (Y, Xmax), where the Xmax is a maximum value of X (step S27). That is, the non-draw points are set to the focused dot (focused pixel) and the subsequent dots for one row along a scanning direction of dot columns in the OSD image data. Next, the process sets Y=Y+1 (step S28), and proceeds to the process for the next row in the OSD image, in which the process subsequent to step S22 is carried out in a similar manner.

In step S29, the focused bit is incremented with value "1", and the process proceeds to step S30. Which means that a bit next to the present focused bit is set as a new focused bit.

In step S30, a minimum bit number of (Xmax−X) is set as a value B. Next, in step S31, B bit pieces of bits from the focused bit are extracted, and the value is set as A. Next, in step S32, non-draw points are set to the OSD image for the pixels from (Y, X) to (Y, X+A).

Next, in step S33, the focused bit is incremented with value B. Next, in step S34, the process sets X=X+A. In other words, A is added to X.

Next, in step S35, a minimum bit number of (Xmax−X) is set as a value B. Next, in step S36, B bit pieces of bits from the focused bit are extracted, and the value is set as A. Next, in step S37, draw points are set to the OSD image for the pixels from (Y, X) to (Y, X+A).

Next, in step S38, the focused bit is incremented with value B. Next, in step S39, the process sets X=X+A. In other words, A is added to X. After then, the process proceeds to step S25.

Thus, according to the embodiment, the following are performed. That is, when extracting the compressed data, the OSD control unit 6 executes the process of: focusing on a first bit in the compressed data and setting the first bit as a fist focused bit; determining whether or not a draw point exists ahead of a focused dot corresponding to the focused bit based on the present focused bit; performing, in a case where determined that no draw point exists by the draw-point presence/absence determining unit, the process of setting a bit next to the present focused bit as a present focused bit, and setting non-draw point to the focused dot and the subsequent dots for one row along a scanning direction of dot columns in the OSD image data; and performing, in a case where determined that draw point exists by the draw-point presence/absence determining unit, the process of setting a bit next to the present focused bit as a present focused bit, setting non-draw point to the dots from the focused dot to the dot just before the draw point, setting a bit next to the present focused bit as a present focused bit, and setting draw point to the present focused dot and the subsequent dots based on the focused bit, wherein after the first focused bit being set, the determining process, the non-draw point setting process, and the draw point setting process are repeated, to thereby extracting the OSD image data from the compressed data.

According to the embodiment, OSD image data can be extracted efficiently and the capacity of OSD memory can be further reduced. This makes it possible to reduce cost of apparatus main units, such as DVD players, VHS players, televisions, which have an OSD function.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. An image-data compressing apparatus for compressing a binary image data, the apparatus comprising:
    a start-focus-point setting unit that focuses on one row along a scanning direction of dot columns in the binary image data and sets one end of the one row as a start-focus point;
    a draw-point presence/absence setting unit that sets a draw-point presence/absence information bit indicating whether or not a draw point exists ahead of the start-focus point;
    a draw-start-point information setting unit that sets a draw-start point information bit indicating how many dots away from the start-focus point a draw-start point is if the draw point is present;
    a draw-point-number information setting unit that sets a draw-point number information bit that indicates how many draw point continues from the draw start point; and
    a start-focus point/draw-point presence/absence setting unit that sets a next dot to the draw point that is a subject to the set draw-point number information bit as a next start-focus point, and sets a draw-point presence/absence information bit that indicates whether or not a draw point exists ahead of the next start-focus point,
    wherein, after the start-focus point being set by the start-focus-point setting unit, the draw-point presence/absence setting unit, the draw-start-point information setting unit, the draw-point-number information setting unit, and the start-focus point/draw-point presence/absence setting unit repeats the process thereof for a plurality of rows corresponding to the dot columns in the binary image data, to thereby obtain a compressed data of the binary image data from a bit string of the bits set by the respective units.

2. The image-data compressing apparatus according to claim 1, wherein the binary image data is an OSD image data to be displayed as an On-Screen-Display image on a display.

3. The image-data compressing apparatus according to claim 1, wherein the draw-point presence/absence setting unit sets as the draw-point presence/absence information bit a logical "1" if a draw point exists ahead of the start-focus point and a logical "0" if no draw point exists ahead of the start-focus point.

4. The image-data compressing apparatus according to claim 1, wherein the start-focus point/draw-point presence/absence setting unit sets as a draw-point presence/absence information bit a logical "1" if a draw point exists ahead of the next start-focus point and a logical "0" if no draw point exists ahead of the next start-focus point.

5. The image-data compressing apparatus according to claim 1, wherein the draw-point-number information setting unit sets, as the draw-point number information bit, a value obtained by subtracting a numerical value 1 from the total number of a draw point of the draw start point and subsequent draw points that follow the draw point.

6. An image-data compressing method for compressing a binary image data, the method comprising:
    focusing on one row along a scanning direction of dot columns in the binary image data and setting one end of the one row as a start-focus point;
    setting a draw-point presence/absence information bit indicating whether or not a draw point exists ahead of the start-focus point;
    setting a draw-start point information bit indicating how many dots away from the start-focus point a draw-start point is if the draw point is present;
    setting a draw-point number information bit that indicates how many draw point continues from the draw start point; and
    setting a next dot to the draw point that is a subject to the set draw-point number information bit as a next start-focus point, and setting a draw-point presence/absence information bit that indicates whether or not a draw point exists ahead of the next start-focus point,
    wherein, after the start-focus point being set, the processes for setting the draw-point presence/absence information bit, the draw-start-point information bit, the draw-point-number information bit, and the draw-point presence/absence information bit are repeated for a plurality of rows corresponding to the dot columns in the binary image data, to thereby obtain a compressed data of the binary image data.

7. An image-data extracting apparatus for extracting binary image data from compressed data, the apparatus comprising:
    a focus bit setting unit that focuses on a first bit in the compressed data and sets the first bit as a fist focused bit;
    a draw-point presence/absence determining unit that determines whether or not a draw point exists ahead of a focused dot corresponding to the focused bit based on the present focused bit;
    a non-draw-point setting unit that, in a case where determined that no draw point exists by the draw-point presence/absence determining unit, sets a bit next to the present focused bit as a present focused bit, and sets non-draw point to the focused dot and the subsequent dots for one row along a scanning direction of dot columns in the binary image data; and
    a draw-point setting unit that, in a case where determined that draw point exists by the draw-point presence/ absence determining unit, sets a bit next to the present focused bit as a present focused bit, sets non-draw point to the dots from the focused dot to the dot just before the draw point, sets a bit next to the present focused bit as a present focused bit, and sets draw point to the present focused dot and the subsequent dots based on the focused bit, wherein after the first focused bit being set by the focus bit setting unit, the draw-point presence/absence determining unit, the non-draw-point setting unit, and the draw-point setting unit repeats the process thereof, to thereby extracting the binary image data from the compressed data.

8. The image-data extracting apparatus according to claim 7, wherein the binary image data is an OSD image data to be displayed as an On-Screen-Display image on a display.

9. An image-data extracting method for extracting binary image data from compressed data, the method comprising:

focusing on a first bit in the compressed data and setting the first bit as a fist focused bit;

determining whether or not a draw point exists ahead of a focused dot corresponding to the focused bit based on the present focused bit;

performing, in a case where determined that no draw point exists by the draw-point presence/absence determining unit, the process of setting a bit next to the present focused bit as a present focused bit, and setting non-draw point to the focused dot and the subsequent dots for one row along a scanning direction of dot columns in the binary image data; and performing, in a case where determined that draw point exists by the draw-point presence/absence determining unit, the process of setting a bit next to the present focused bit as a present focused bit, setting non-draw point to the dots from the focused dot to the dot just before the draw point, setting a bit next to the present focused bit as a present focused bit, and setting draw point to the present focused dot and the subsequent dots based on the focused bit, wherein after the first focused bit being set, the determining process, the non-draw point setting process, and the draw point setting process are repeated, to thereby extracting the binary image data from the compressed data.

* * * * *